(12) United States Patent
Hunter et al.

(10) Patent No.: US 10,742,083 B2
(45) Date of Patent: Aug. 11, 2020

(54) MAGNETIC ROTOR ASSEMBLY

(71) Applicant: INDIGO TECHNOLOGIES, INC., Cambridge, MA (US)

(72) Inventors: Ian W. Hunter, Lincoln, MA (US); Timothy A. Fofonoff, Cambridge, MA (US); Scott T. Purchase, Cambridge, MA (US)

(73) Assignee: Indigo Technologies, Inc., Woburn, MA (US)

( * ) Notice: Subject to any disclaimer, the term of this patent is extended or adjusted under 35 U.S.C. 154(b) by 272 days.

(21) Appl. No.: 15/974,915

(22) Filed: May 9, 2018

(65) Prior Publication Data

US 2018/0342917 A1 Nov. 29, 2018

Related U.S. Application Data

(60) Provisional application No. 62/511,450, filed on May 26, 2017.

(51) Int. Cl.
  *H02K 37/00* (2006.01)
  *H02K 1/27* (2006.01)
  *H02K 21/24* (2006.01)

(52) U.S. Cl.
  CPC .......... *H02K 1/278* (2013.01); *H02K 1/2793* (2013.01); *H02K 21/24* (2013.01)

(58) Field of Classification Search
  CPC ...... H02K 16/02; H02K 1/278; H02K 1/2793; H02K 21/24
  USPC .......... 310/112–114, 46, 266, 261.1, 156.37, 310/156.32
  See application file for complete search history.

(56) References Cited

U.S. PATENT DOCUMENTS

| | | | | |
|---|---|---|---|---|
| 4,536,672 A | * | 8/1985 | Kanayama | H02K 3/26 310/156.37 |
| 5,982,074 A | * | 11/1999 | Smith | H02K 3/04 310/156.36 |
| 9,831,726 B2 | * | 11/2017 | Zhang | H02K 21/16 |
| 9,899,886 B2 | * | 2/2018 | Sullivan | H02K 1/2793 |

(Continued)

OTHER PUBLICATIONS

International Search Report and Written Opinion in PCT/US2018/031773 dated Aug. 28, 2018 12 pages.

*Primary Examiner* — Thanh Lam
(74) *Attorney, Agent, or Firm* — Smith Baluch LLP

(57) ABSTRACT

A magnetic rotor including: a support structure with a rotational axis, with a front side having a first annular region encircling the rotational axis, and with a back side having a second annular region encircling the rotational axis, the support structure having a first array of pockets formed in the front side within the first annular region and encircling the rotational axis, and a second array of pockets formed in the back side within the second annular region and encircling the rotational axis, and wherein the pockets of the first array of pockets are interleaved with the pockets of the second array of pockets; a first plurality of magnets contained within the pockets of the first array of pockets on the first side of the support structure; and a second plurality of magnets contained within the pockets of the second array of pockets on the second side of the support structure, wherein the pockets of the first and second arrays of pockets have obstructions against which the magnets contained within the pockets rest.

24 Claims, 10 Drawing Sheets

(56) References Cited

U.S. PATENT DOCUMENTS

| | | | |
|---|---|---|---|
| 2010/0052452 A1* | 3/2010 | Yoshino | H02K 1/2793 310/156.01 |
| 2010/0164316 A1* | 7/2010 | Langford | H02K 1/2793 310/156.29 |
| 2014/0132102 A1 | 5/2014 | Peng et al. | |
| 2015/0229194 A1 | 8/2015 | Sromin | |
| 2016/0329795 A1 | 11/2016 | Ricci et al. | |
| 2017/0133891 A1 | 5/2017 | Klassen | |
| 2018/0076701 A1* | 3/2018 | Hunter | H02K 16/04 |

* cited by examiner

MAGNETIC ROTOR ASSEMBLY

CROSS-REFERENCE TO RELATED APPLICATIONS

This application claims the benefit under 35 U.S.C. 119(e) of U.S. Provisional Application No. 62/511,450, filed May 26, 2017, all of which is incorporated herein by reference.

TECHNICAL FIELD

Embodiments of the invention generally relate to electric motors and more specifically to the magnetic rotor assemblies within electric motors such as axial flux electric motors.

BACKGROUND

Axial flux motors are a separate category of electric motor that are distinguished from other more conventional electric motors by the direction in which the magnetic flux paths are oriented. In conventional electric motors, the magnetic flux is directed radially through an air gap between the rotor and the stator. There is a small gap between the outer surface of the rotor and the inner diameter of the stator, so these motors are sometimes referred to as radial gap or radial flux machines. In axial flux motors, the magnetic flux is directed in axial direction, i.e., a direction that is parallel to the rotational axis of the motor, and through a small gap between the rotor and the stator. As a consequence, axial flux motors are also sometimes referred to as axial gap motors.

In its most simple form, the axial flux motor has two components: a rotor and a stator. Typically, the rotor is fitted with an array of permanent magnets arranged in an alternating pole configuration and the stator contains an array of wire coils. Electric currents provided to the array of coils within the stator result in a magnetic flux that attracts and repels the different magnets in the rotor, thereby causing it to rotate with respect to the stator and about a rotational axis.

Axial flux motors typically represent a more efficient design than radial flux motors in that they are characterized by a higher torque or power to mass ratio. And they are particularly good for applications in which quick changes in motor speed are desired.

SUMMARY

In general, in one aspect, the invention features a magnetic rotor including: a support structure with a rotational axis, with a front side having a first annular region encircling the rotational axis of the support structure, and with a back side having a second annular region encircling the rotational axis of the support structure, the support structure having a first array of pockets formed in the front side within the first annular region and encircling the rotational axis, and a second array of pockets formed in the back side within the second annular region and encircling the rotational axis, and wherein the pockets of the first array of pockets are interleaved with the pockets of the second array of pockets. The magnetic rotor also includes: a first plurality of magnets contained within the pockets of the first array of pockets on the first side of the support structure; and a second plurality of magnets contained within the pockets of the second array of pockets on the second side of the support structure, wherein the pockets of the first and second arrays of pockets have obstructioins against which the magnets contained within the pockets rest.

Other embodiments include one or more of the following features. For each of the pockets of the first and second arrays of pockets, the obstruction is formed by a partial wall or a wall covering the bottom of the pocket. The magnets contained within the first and second arrays of pockets together form a Halbach array. The magnets contained within the first array of pockets all have magnetization directions that are orthogonal to a plane that is parallel to the first side of the support structure. The magnets contained within the second array of pockets all have magnetization directions that are parallel to the plane that is parallel to the first side of the support structure. The support structure comprises a non-ferromagnetic material, e.g. aluminum or plastic. The pockets of the first array of pockets are evenly spaced within the first annular region around the support structure. The pockets of the second array of pockets are evenly spaced within the second annular region around the support structure. The spacing between the pockets of the first array of packets and the spacing between the pockets of the second array of packets are equal. The support structure has a circular disk-shape with a central axis coinciding with the rotational axis.

In another aspect, the invention features a magnetic rotor including: a support structure having a rotational axis, having a front side with a first annular region encircling the rotational axis, and having a back side with a second annular region encircling the rotational axis, the support structure including a first array of pockets formed in the front side within the first annular region and encircling the rotational axis, and a second array of pockets formed in the back side within the second annular region and encircling the rotational axis, and wherein the first array of pockets is aligned with the second array of pockets to form a plurality of aligned pocket pairs, wherein each pocket of the first array of pockets is aligned with a corresponding different pocket of the second array of pockets to form a corresponding different aligned pocket pair of the plurality of aligned pocket pairs. The magnetic rotor also includes: a first plurality of magnets contained within the pockets of the first array of pockets on the first side of the support structure; and a second plurality of magnets contained within the pockets of the second array of pockets on the second side of the support structure, wherein within each aligned pocket pair of the plurality of aligned pocket pairs, the magnets within that aligned pocket pair have the same magnetization directions, and wherein for each aligned pocket pair of the plurality of aligned pocket pairs, the support structure has a wall separating the two pockets of that aligned pocket pair.

Other embodiments include one or more of the following features. For each aligned pocket pair of the plurality of aligned pocket pairs, the wall for that aligned pocket pair defines a bottom of each of the two pockets of that aligned pocket pair. The wall may or may not extend entirely across the bottoms of the pockets. In any event, the wall forms a barrier against which the magnets within the two pockets of that aligned pocket pair rest. The support structure comprises a non-ferromagnetic material, e.g. aluminum or plastic. The pockets of the first array of pockets are evenly spaced within the first annular region. The support structure has a circular disk-shape with a central axis coinciding with the rotational axis.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

In the preceding figures, like elements may be identified with like reference numbers.

DETAILED DESCRIPTION

Figure 1:
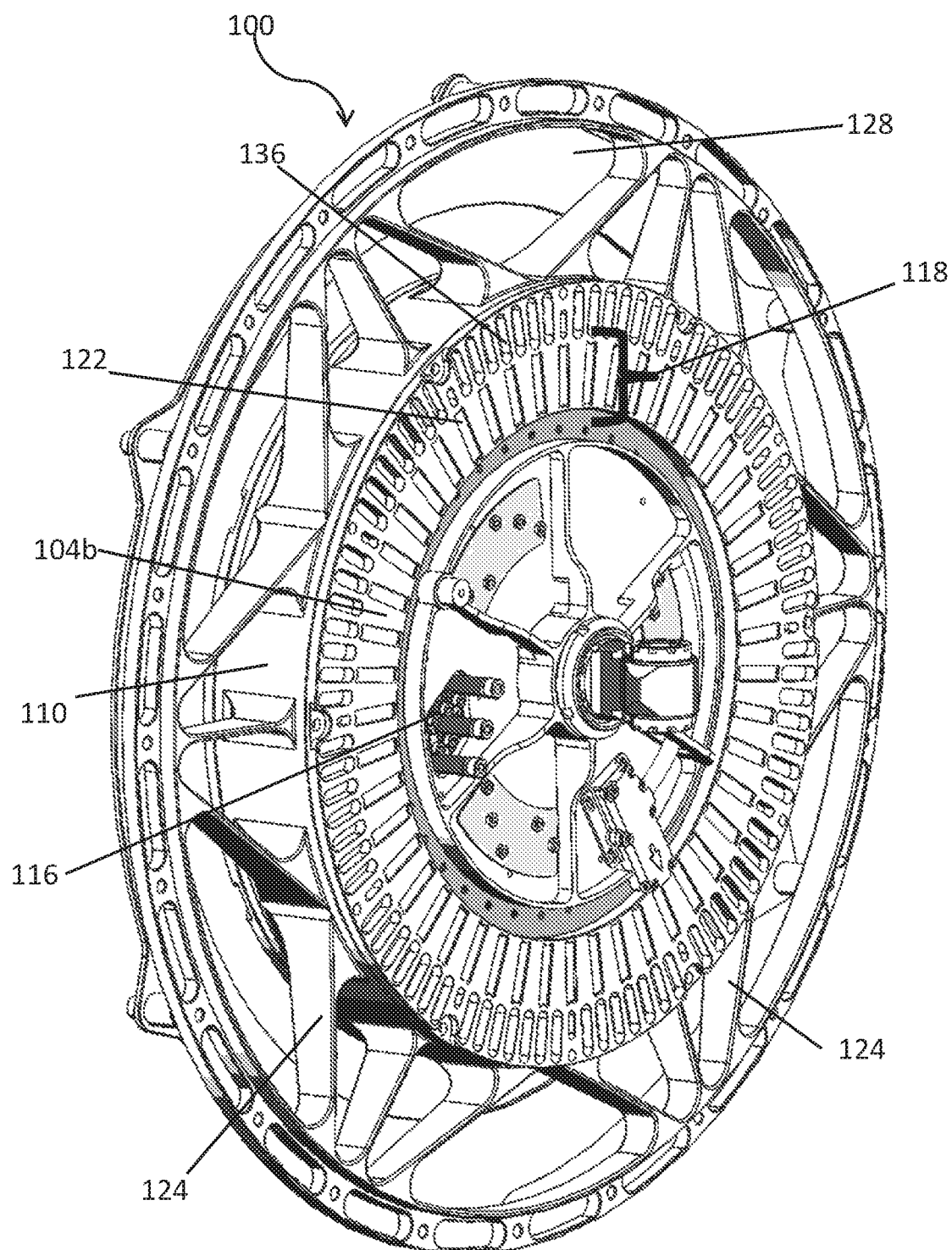
FIG. 1 is a perspective view of an exemplary embodiment of an axial flux electric motor.
Figure 2:
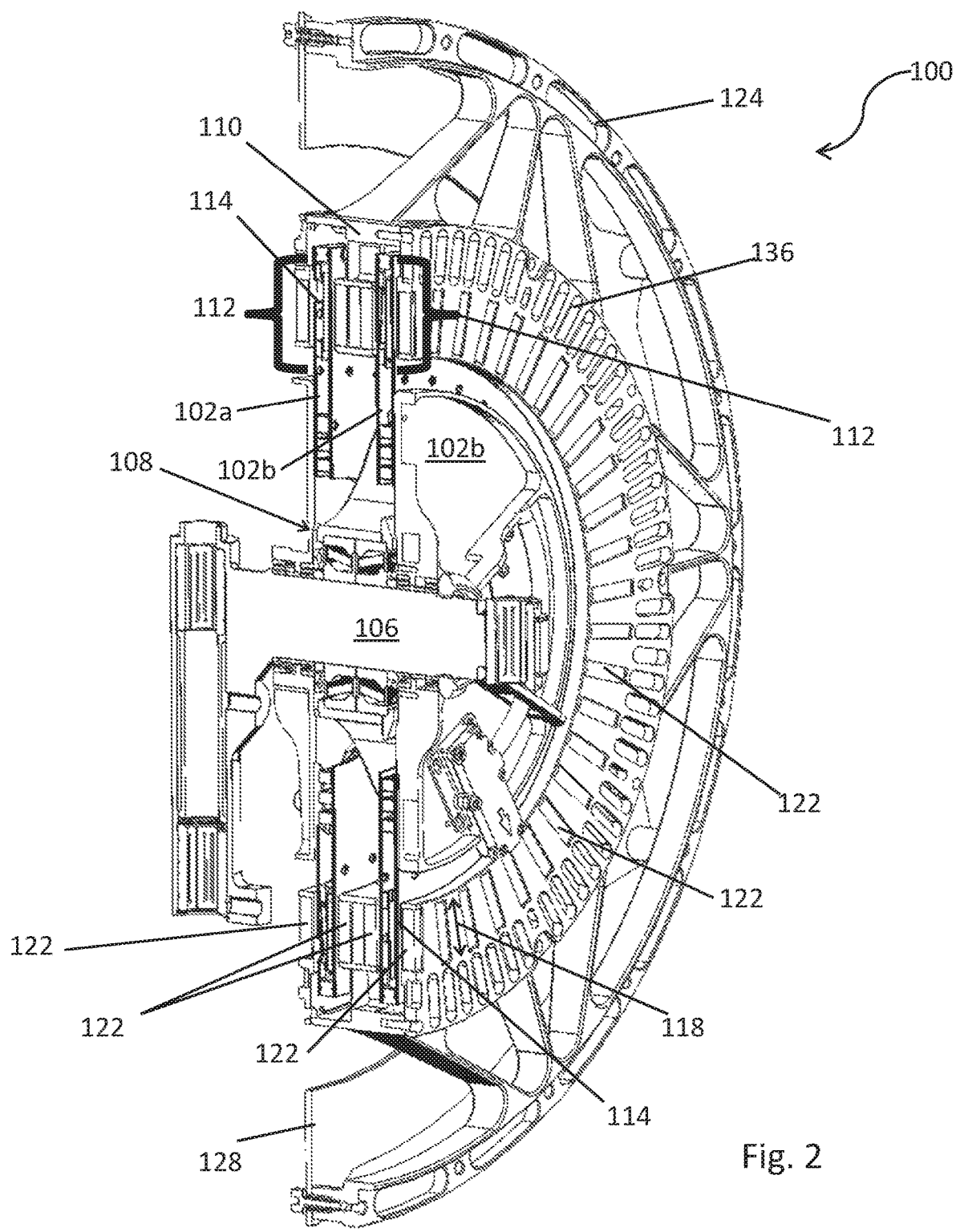
FIG. 2 is a cross-sectional view of an exemplary embodiment of the axial flux electric motor.
Figure 3:
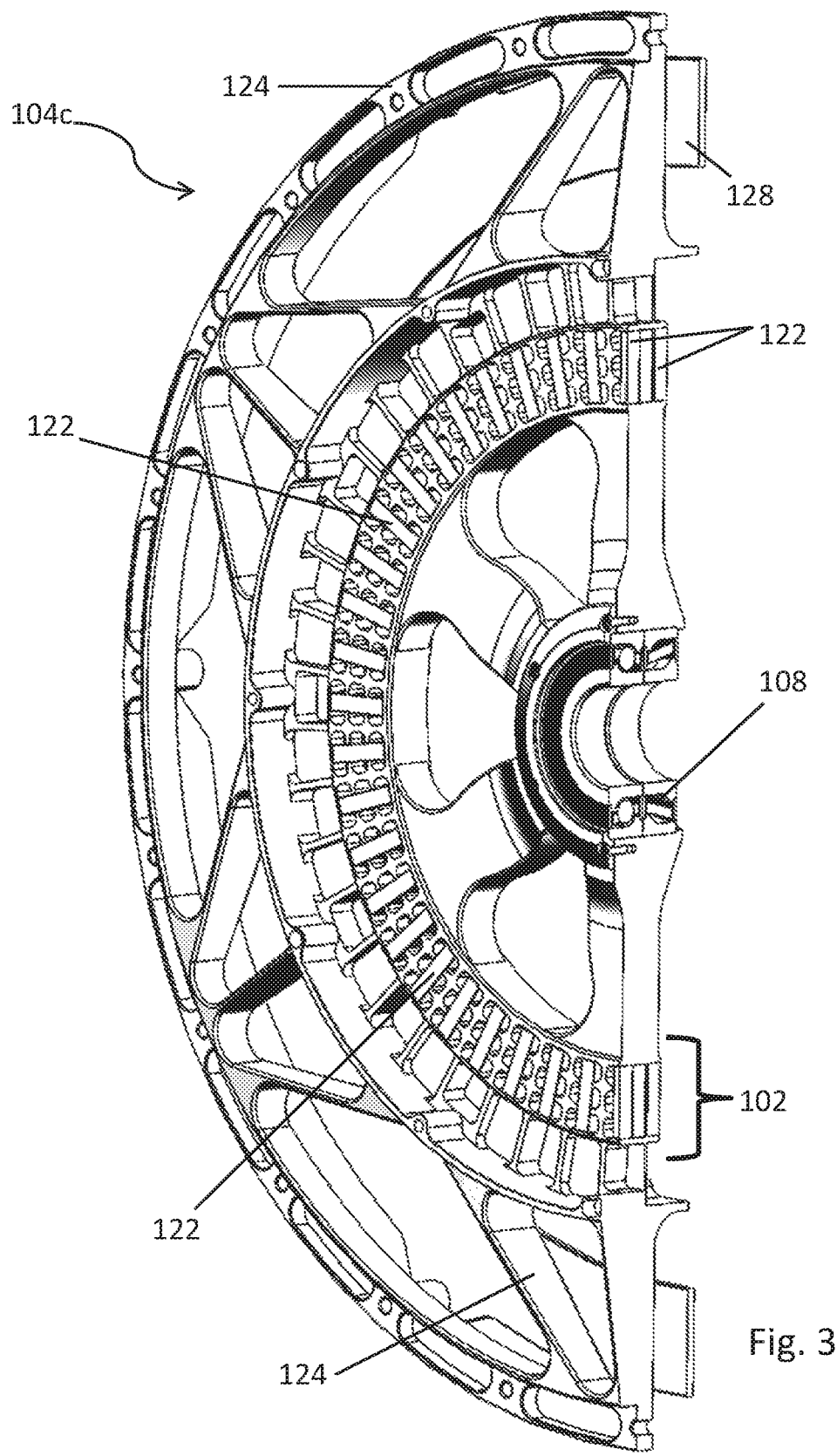
FIG. 3 is a cross-sectional view of the center magnetic rotor.
Figure 4:
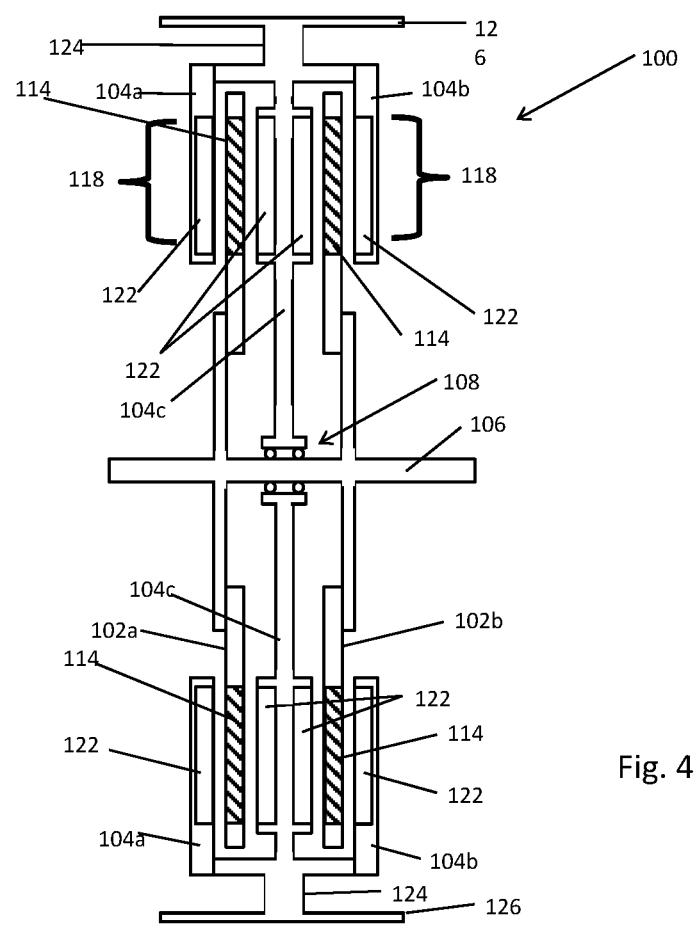
FIG. 4 is a cross-sectional view of a schematic representation of the axial flux electric motor depicted in FIG. 1.

Referring to FIGS. 1-4, the described embodiment is an axial flux electric hub (or in-wheel) motor assembly 100 such as might be used in a vehicle. FIG. 1 shows a perspective view of the assembled motor; FIG. 2 shows a cross-sectional perspective view of the motor; and FIG. 3 shows a view of the motor with some of its parts removed to reveal internal structure. FIG. 4, which is a schematic representation of the motor shown in FIGS. 1-3, more clearly reveals the constituent components of the motor assembly and their relationship to each other.

Motor assembly 100 includes two coil stator assemblies 102a and 102b and a magnetic rotor assembly made up of three magnetic rotors including outer magnetic rotors 104a and 104b and a central magnetic rotor 104c. One coil stator assembly 102a is sandwiched between and spaced apart from magnetic rotors 104a and 104c, and the other coil stator assembly 102b sandwiched between and spaced apart from magnetic rotors 104c and 104b. Each of the outer magnetic rotors 104a and 104b is a generally annular-shaped structure that is arranged about a central cylindrical spindle 106 with its rotational axis aligned with the axis of the spindle 106. The central magnetic rotor 104c is mounted on the spindle 106 through a bearing assembly 108 so that it can freely rotate about the spindle 106. Around the perimeter of the central magnetic rotor 104c, there is a cylindrically shaped collar 110 to which the other two magnetic rotors 104a and 104b are attached, with one magnetic rotor 104a on one side of the collar 110 and the other magnetic rotor 104b on the other side of the collar 110. With this arrangement, the two outer magnetic rotors 104a and 104b rotate with the central magnetic rotor 104c about the spindle 106. The coil stator assemblies 102a and 102b, which are also generally disc-shaped structures, are affixedly mounted on the spindle 106 so that they do not rotate about the spindle but remain stationary as the magnetic rotor assembly rotates.

Each coil stator assembly 102a and 102b has an annular region 112 and within that annular region 112 there is an array of coils 114 distributed around the perimeter of the disk. As shown in FIGS. 1 and 2, there is also a connector 116 for electrically connecting to the coils within the array of coils and through which drive signals are delivered to those coils. The coils are fabricated or wound to produce generally radially oriented current paths through which drive currents are passed to operate the motor. Various approaches to constructing the array of coils are well known so the details will not be provided here.

Each outer magnetic rotor 104a and 104c also has an annular region 118, and central magnetic rotor 104c also have an annular region 120. When the three rotors are mounted on the spindle 106, these annular regions 118 and 120 are generally aligned with the annular regions 112 of the coil stator assemblies 102a and 102b. Around each magnetic rotor and within the annular regions there is an array of permanent magnets 122. As will be described in greater detail shortly, the magnets 122 are arranged to produce an axially directed magnetic field that intersects the coil windings and that alternates from one axial direction to the opposite axial direction as one moves around the circumference of the disk.

The described embodiment also includes a spoke assembly 124 encircling and extending away from the collar 110 and supporting a rim 126 onto which a tire (not shown) could be mounted. A spoke assembly is used instead of a solid ring of material as a weight savings measure. There is also a brake disk 128 attached to the spoke assembly 124.

Figure 5A:
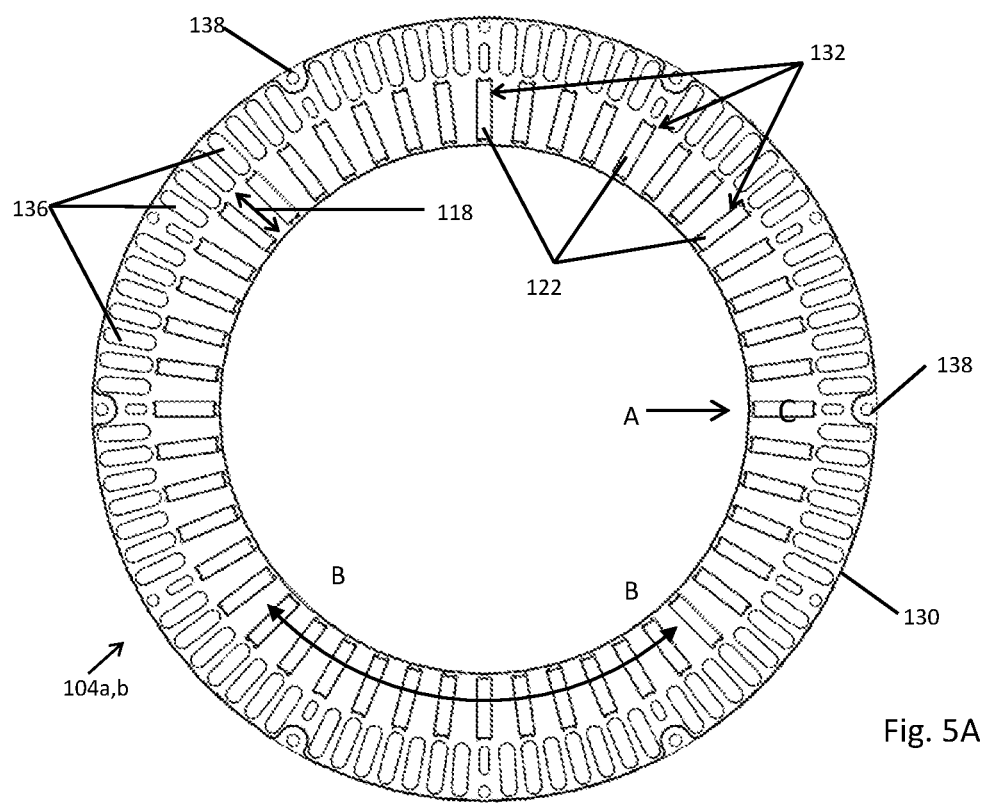
FIG. 5A is a front view of one of the magnetic rotors shown in FIG. 1.
Figure 5B:
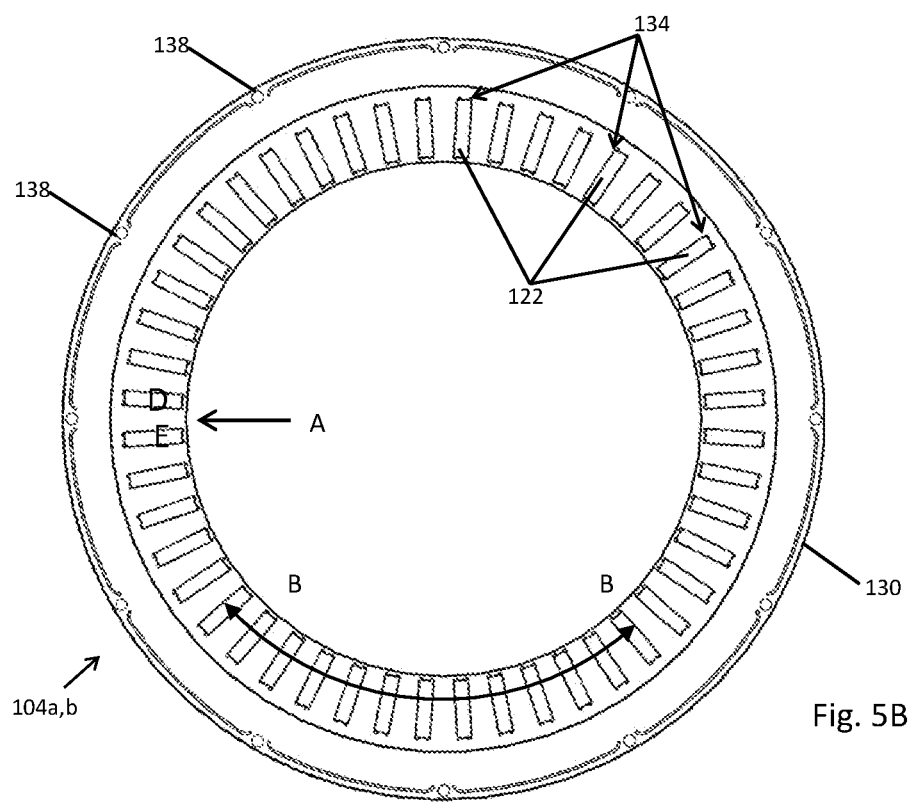
FIG. 5B is a back view of the magnetic rotor shown in FIG. 3A.

FIGS. 5A and 5B show more detailed views of the front and backsides, respectively, of the magnetic rotors 104a and 104b. Each magnetic rotor 104a and 104b is a circular annular ring 130 of non-ferromagnetic material. On the front side of the annular ring 130 there is an array of evenly spaced slots or pockets 132 formed within the annular region 118 of the ring 130. On the backside of the ring, there is another array of evenly spaced slots or pockets 134 formed within the annular region 118 of the ring. The pockets 132 and 134 extend almost but not completely the full width of the rotor. That is, the depths of the pockets 132 and 134 are slightly less than the width of the rotor. Each of the pockets 132 and 134 on both sides of the annular ring firmly holds one of the magnets 122 of the array of magnets within the magnetic rotor.

Note that because of the closeness of fit between the magnets 122 and the walls of the pockets 132 and 134 holding the magnets, in FIGS. 5A and 5B it is difficult to distinguish the pockets from the magnets. However, their relationship to each other is more clearly visible in FIG. 6, which is discussed below.

Also, on the front side, between the annular region 118 and the outer perimeter of the ring 130, there is another array of evenly spaced slots 136 formed in the annular ring 130. This array of slots 136 serves to reduce the weight of the magnetic rotor 104a,b as was the case with the spoke assembly. Around the perimeter of the annular ring, there is a set of holes 138 which provide locations at which fasteners are used to attach the annular ring to the collar 110 (see FIG. 1).

The array of equally spaced pockets on one side of the annular ring is offset from the array of equally spaced pockets on the other side of the annular ring so that a pocket on one side lies midway between two pockets on the other side. That is, the pockets of the two arrays of pockets are interleaved with each other. This is illustrated in FIGS. 5A and 5B by arrow A. In particular, pocket C on the front side is located midway between pockets D and E and the backside. This is the case throughout the entire array of pockets on both sides. The result is a combined array of magnets arranged substantially within the same plane.

In general, it may be desirable to form the pockets on both sides of the annular ring so as to produce a closely spaced array of magnets. In other words, the walls separating one pocket from the next would be narrow, though not so narrow as to compromise the rigidity and strength of the annular ring.

Figure 6:
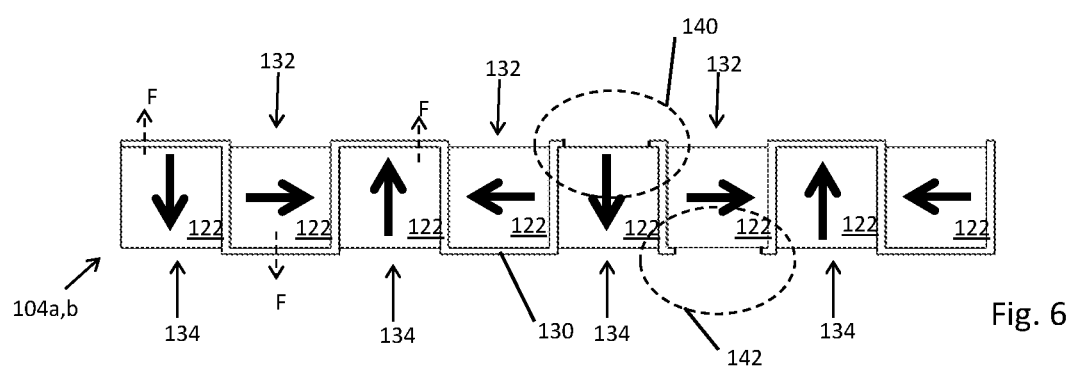
FIG. 6 is a cross-sectional view of the arrangement of magnets in the outer magnetic rotors shown in FIG. 4.

FIG. 6 shows a cross-sectional view of part of the magnetic rotor of FIG. 5A taken along the line marked B-B in FIG. 5A. As shown, the pockets 132 extend in from the surface of the front side of the annular ring 130 and to a depth that is less than the thickness of the annular ring 130, leaving a back wall to the pocket. Similarly, the pockets 134 extend in from the surface of the backside of the annular ring 130 and to a depth that is again less than the thickness of the annular ring 310, leaving a back wall to the pocket. The pockets are sized to provide a relatively snug fit for the magnets 122 and the magnets 122 have a thickness that is equal to or approximately equal to the depth of the pockets.

Importantly, the magnets are inserted into the pockets with their magnetic moments arranged to form a Halbach or modified Halbach array. As is well known, a Halbach array is a special arrangement of the magnetization directions of permanent magnets that results in the augmentation of the magnetic field that is produced on one side of the array and the attenuation or cancelling of the magnetic field to near zero on the other side of the array. In general, this is achieved by arranging the magnets so that they have a spatially rotating pattern of magnetization directions. The rotating pattern, if repeated, produces the same result, namely, an enhanced magnetic field on one side and an attenuated magnetic field on the opposite side.

FIG. 6 shows one example of an arrangement of magnets that produces a Halbach array. Starting from the leftmost magnet, which has a magnetization direction pointed downward, and moving to the right, the magnetization direction of each successive magnet is rotated+90° with respect to the previous magnet. At the fifth magnet in from the left, the pattern repeats and continues to repeat until one has progressed around the disk and returned to the starting point. In this example, that means the number of magnets in the array is equal to 4n where n is an integer. But, the crucial point is that the flux will cancel below the annular ring 130 and reinforce itself above the annular ring 130.

A particular advantage of the design of the magnetic rotor is that the placement of the magnets in the pockets so as to form a Halbach array generates a magnetic force on the magnets that holds them in the pockets. For example, consider the first four magnets on the left in FIG. 6. The first and third magnet will generate a downward directed force on the second magnet pulling it into the pocket in which it is located. Similarly, the second and fourth magnet will generate an upward directed force on the third magnet pulling it into the pocket in which it is located. And so on around the annular ring of magnets. For permanent magnets, this force can be quite strong, in fact, sufficiently strong to hold the magnets in the annular ring without needing to use other retaining means, such as glues, adhesives, or mechanical fasteners. This simplifies manufacture of the assembled magnetic rotor and yields a lighter structure.

Figure 9:
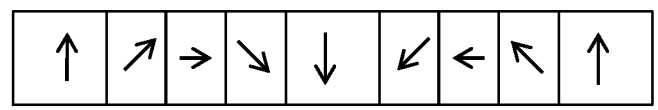
FIG. 9 shows an alternative arrangement of magnets in the magnetic rotor.

In general, any magnetization pattern in which the components of magnetization rotate from one element to the next will result in a one-sided flux and can be used to achieve the above-described benefit. For example, another arrangement is shown in FIG. 9. In this example, each successive magnet has its magnetization direction rotated+45° with respect the previous magnet. The pattern involves eight magnets and repeats thereafter.

In the description provided thus far, the bottom of each pocket formed a solid, continuous wall (see FIG. 6). However, the material at the bottom of the pocket need not extend over the entire bottom of the pocket. In some embodiments, it may be desirable to simply provide a lip or stops or tabs or some obstruction which prevent the magnet 122 from being pushed out of the other side of the annular ring 130 and against which the magnet 122 rests when fully inserted into the pocket. Indeed, the obstruction could be formed by depositing dab of glue or epoxy to for the tab or obstruction. In any event, this approach can be used in the pockets on both sides of the annular ring, as is illustrated in the portions of FIG. 6 that are identified by the dashed ovals identified by reference numbers 140 and 142. Using stops or tabs would provide a way of further reducing the total weight of the magnetic rotor.

Figure 7:
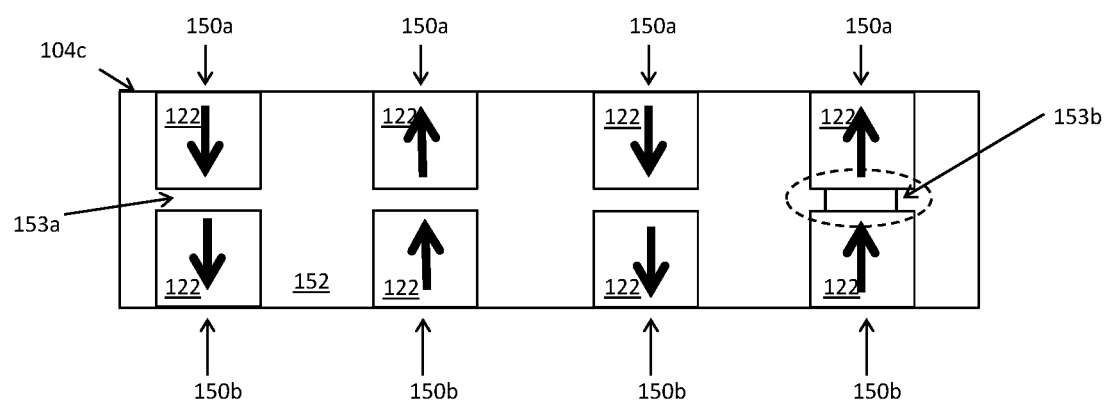
FIG. 7 is a cross-sectional view of the arrangement of magnets in the central magnetic rotor shown in FIG. 4.

In the axial flux motor illustrated in FIG. 1, it is not desirable to reduce the magnetic field on either side of the central magnetic rotor 104c there is a coil stator assembly adjacent to both sides of the rotor 104c and the magnetic field needs to be strong on both sides, not attenuated. So a different arrangement of magnets such as that shown in FIG. 7 is used. In this case, there is a circular array of evenly spaced pockets 150a formed in an annular region of the rotor 152 on one side and another circular array of evenly spaced pockets 150b formed in an annular region in the rotor 152 on the opposite side. The number of pockets in each array is equal and each pocket 150a of one array of pockets is aligned with and opposite a corresponding pocket 150b on the other side. In addition, the depth of each pocket is less than half the width of the rotor 152 so that there is a wall 153a or 153b separating the two aligned pockets. The number of pockets 150a and 150b is one half the total number of pockets in the outer magnetic rotors. Within each pocket 150a there is a magnet and within each pocket 150b there is another magnet that has the same magnetization direction as the magnet held within the corresponding aligned pocket on the other side of the rotor 152. The magnetization direction of the two magnets within each pair of pockets is orthogonal to the plane of the rotor disk (or parallel to the rotational axis of the rotor disk); it is oriented either in one direction (e.g. the north direction) or the opposite direction (e.g. the south direction); and it alternates between these two directions as one moves along the array of magnets, as illustrated in FIG. 7. With this arrangement (i.e., two magnets with same polarity stacked with a wall separating them), the magnets will tend to hold each other within their respective pockets by magnetic attraction. Also note that the wall at the bottom of the pockets may be a solid wall as identified by reference number 153a or a partial wall as identified by reference number 153b. Indeed, it can be any obstruction which prevents the magnet from passing through into the other pocket. In any event, the wall serves the purpose of providing a stop against which the magnets rest when they are placed within their respective pockets and thus can be any shape that serves that function.

Figure 8:
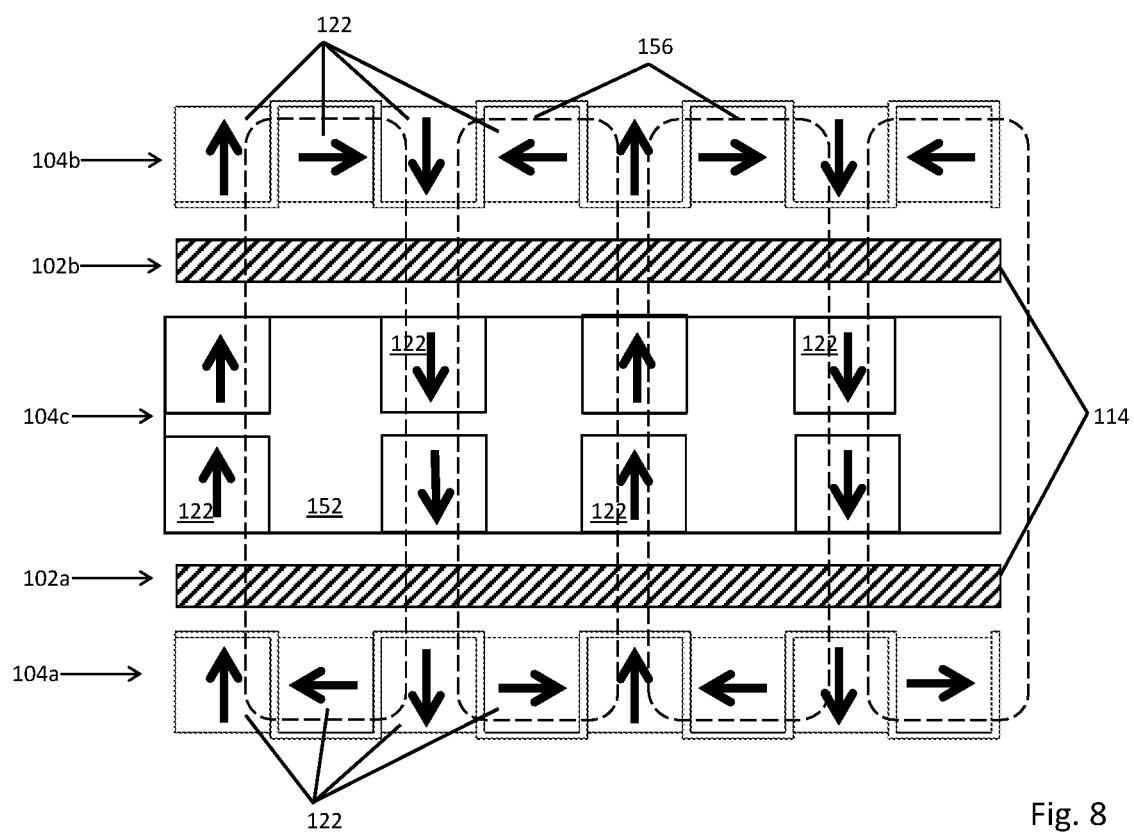
FIG. 8 is a cross-sectional view of the arrangement of the magnetic rotors and the coil stator assemblies shown in FIG. 4.

The central magnetic rotor 104c and the two outer magnetic rotors 104a and 104b are assembled together to form the magnetic rotor assembly. FIG. 8 is a cross-sectional view of a portion of the assembled unit that shows how the three rotors are aligned with each other and with the coil stator assemblies 102a and 102b. The magnetic rotors 104a and 104b are positioned so that the enhanced magnetic fields are on the sides that are facing the windings of the coil stator assemblies 102a and 102b. The polarity of the magnets in the magnetic rotors are aligned to form magnetic field loops as indicated by the dashed lines identified by reference number 156. In other words, the magnets within the three magnetic rotors that have their magnetization directions pointing north are aligned with each other, the magnets within the three magnetic rotors that have their magnetization directions pointing south are aligned with each other, and the magnets in magnetic rotor 104a that have their magnetization directions pointing in either a left or a right direction are aligned with the magnets in magnetic rotor 104b that are oppositely directed.

Figure 10:
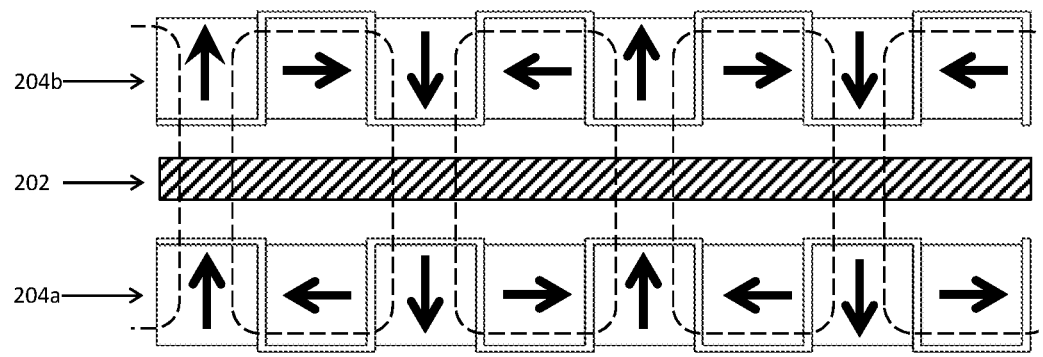
FIG. 10 is a cross-sectional view of an alternative arrangement of an axial flux motor that has a coil stator assembly sandwiched between two magnetic rotors.

An alternative axial flux motor design, shown in FIG. 10, has a coil stator assembly 202 sandwiched between two magnetic rotors 204a and 204b. In this case, the two magnetic rotors are aligned with each other as they were in the example shown in FIG. 8.

One advantage of the structure described above is that the magnets will tend to hold each other within the pockets of the two arrays without the need of further fixtures, clamps, or adhesive materials. That does not mean, however, that such further retaining means might not also be used in particular embodiments.

Other embodiments are within the following claims. For example, the sizes of the magnets in the embodiments described above were all the same, i.e., identical widths, heights, and lengths. However that need not be the case. The widths of the magnets whose magnetization directions lie in the plane of the annular ring could be different from the widths of the magnets whose magnetization directions are orthogonal to the plane of the annular ring.

In addition, the thicknesses of the magnets can be less than, equal to, or greater than the depth of the pockets. And instead of being rectangular or box-shaped as shown above, it may be desirable to use magnets having another shape, such as a tapered shape or a pie shape. Also, the depth of the pockets of one side of the magnetic rotor need not be the same as the depth of the pockets on the other side of the rotor.

What is claimed is:

1. A magnetic rotor comprising:
   a support structure with a rotational axis, with a front side having a first annular region encircling the rotational axis, and with a back side having a second annular region encircling the rotational axis, said support structure having a first array of pockets formed in the front side within the first annular region and encircling the rotational axis, and a second array of pockets formed in the back side within the second annular region and encircling the rotational axis, and wherein the pockets of the first array of pockets are interleaved with the pockets of the second array of pockets;
   a first plurality of magnets contained within the pockets of the first array of pockets on the first side of the support structure; and
   a second plurality of magnets contained within the pockets of the second array of pockets on the second side of the support structure,
   wherein each of the pockets of the first and second arrays of pockets has an obstruction against which the magnet contained within that pocket rests.

2. The magnetic rotor of claim 1, wherein for each of the pockets of the first and second arrays of pockets the obstruction is formed by a partial wall.

3. The magnetic rotor of claim 1, wherein for each of the pockets of the first and second arrays of pockets the obstruction is formed by a wall covering the bottom of the pocket.

4. The magnetic rotor of claim 1, wherein the magnets contained within the first and second arrays of pockets together form a Halbach array.

5. The magnetic rotor of claim 4, wherein the magnets contained within the first array of pockets all have magnetization directions that are orthogonal to a plane that is parallel to the first side of the support structure.

6. The magnetic rotor of claim 5, wherein the magnets contained within the second array of pockets all have magnetization directions that are parallel to the plane that is parallel to the first side of the support structure.

7. The magnetic rotor of claim 1, wherein the support structure comprises a non-ferromagnetic material.

8. The magnetic rotor of claim 7, wherein the support structure is made of aluminum.

9. The magnetic rotor of claim 7, wherein the support structure is made of a plastic.

10. The magnetic rotor of claim 1, wherein the pockets of the first array of pockets are evenly spaced within the first annular region around the support structure.

11. The magnetic rotor of claim 10, wherein the pockets of the second array of pockets are evenly spaced within the second annular region around the support structure.

12. The magnetic rotor of claim 11, wherein the spacing between the pockets of the first array of packets and the spacing between the pockets of the second array of packets are equal.

13. The magnetic rotor of claim 1, wherein the support structure has a circular disk-shape with a central axis coinciding with the rotational axis.

14. A magnetic rotor comprising:
    a support structure having a rotational axis, having a front side with a first annular region encircling the rotational axis, and having a back side with a second annular region encircling the rotational axis, said support structure including a first array of pockets formed in the front side within the first annular region and encircling the rotational axis, and a second array of pockets formed in the back side within the second annular region and encircling the rotational axis, and wherein the first array of pockets is aligned with the second array of pockets to form a plurality of aligned pocket pairs, wherein each pocket of the first array of pockets is aligned with a corresponding different pocket of the second array of pockets to form a corresponding different aligned pocket pair of the plurality of aligned pocket pairs;
    a first plurality of magnets contained within the pockets of the first array of pockets on the first side of the support structure; and
    a second plurality of magnets contained within the pockets of the second array of pockets on the second side of the support structure,
    wherein within each aligned pocket pair of the plurality of aligned pocket pairs, the magnets within that aligned pocket pair have the same magnetization directions, and
    wherein for each aligned pocket pair of the plurality of aligned pocket pairs, the support structure has an obstruction separating the two pockets of that aligned pocket pair.

15. The magnetic rotor of claim 14, wherein for each aligned pocket pair of the plurality of aligned pocket pairs, the obstruction for that aligned pocket pair defines a bottom of each of the two pockets of that aligned pocket pair.

16. The magnetic rotor of claim 14, wherein for each aligned pocket pair of the plurality of aligned pocket pairs, the obstruction is a wall.

17. The magnetic rotor of claim 16, wherein for each aligned pocket pair of the plurality of aligned pocket pairs, the wall for that aligned pocket pair extends across the bottoms of the two pockets of that aligned pocket pair.

18. The magnetic rotor of claim 14, wherein for each aligned pocket pair of the plurality of aligned pocket pairs, the obstruction for that aligned pocket pair forms a barrier against which the magnets within the two pockets of that aligned pocket pair rest.

19. The magnetic rotor of claim 14, wherein the support structure comprises a non-ferromagnetic material.

20. The magnetic rotor of claim 19, wherein the support structure is made of aluminum.

21. The magnetic rotor of claim 19, wherein the support structure is made of a plastic.

22. The magnetic rotor of claim 14, wherein the pockets of the first array of pockets are evenly spaced within the first annular region.

23. The magnetic rotor of claim 14, wherein the support structure has a circular disk-shape with a central axis coinciding with the rotational axis.

24. The magnetic rotor of claim 14, wherein within each aligned pocket pair of the plurality of aligned pocket pairs, the magnetization directions of the magnets within that aligned pocket pair are oriented parallel to the rotational axis.

* * * * *